March 18, 1930.  W. M. STIEH, JR  1,750,975
ENGINE VALVE
Filed June 16, 1928
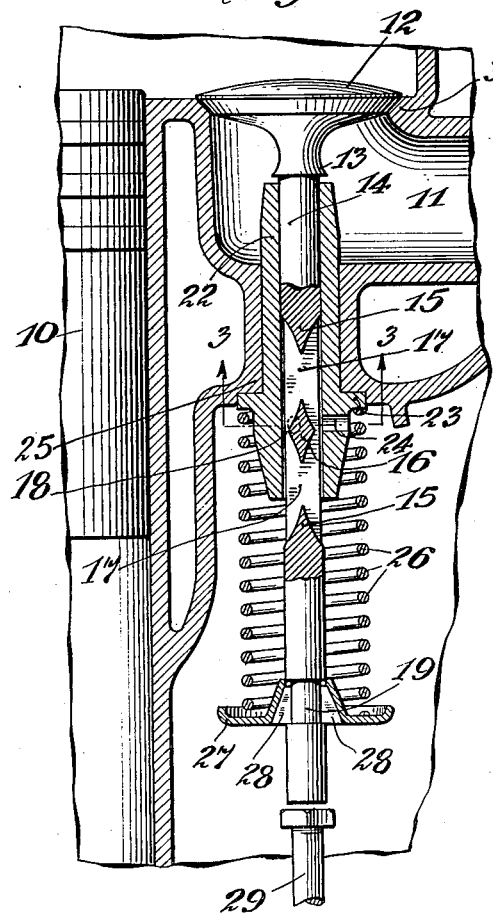
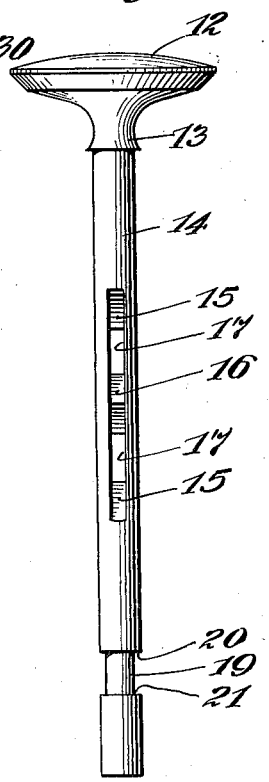
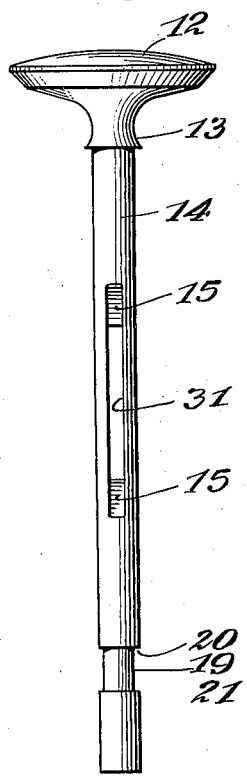
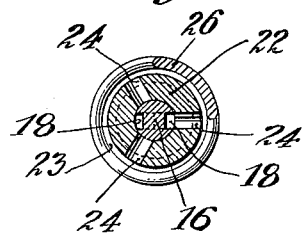
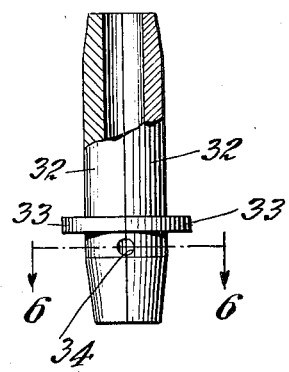
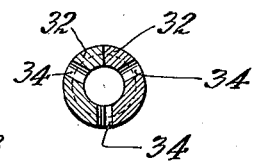
INVENTOR
William M. Stieh Jr
BY
ATTORNEY Patented Mar. 18, 1930

1,750,975

UNITED STATES PATENT OFFICE

WILLIAM M. STIEH, JR., OF RIDGEFIELD PARK, NEW JERSEY

ENGINE VALVE

Application filed June 16, 1928. Serial No. 285,831.

My invention relates to engine valves and refers particularly to engine valves of such construction as to be automatically cooled and lubricated during use.

It is highly desirable that engine valve stems fit as closely as possible to their bearings, or sleeves, and this is particularly advantageous with valves used in internal combustion engines to prevent the entrance of carbon between the stem and the sleeve which results in causing the valve to work slowly or to stick or gum.

Many attempts have been made to overcome this difficulty by incorporating filtering and similar means to prevent the entrance of carbon between the stem and the sleeve.

My invention, however, presents a means whereby this objectionable introduction of carbon is prevented by the automatic cooling of the valve stem.

It is well known that the intense heat to which valves of this character are submitted causes considerable expansion of the several elements of the valve construction, thus making it practically impossible to maintain a close abutment between the valve stem and its sleeve, although attempts have been made to compensate this expansion.

I have overcome this difficulty to a great extent by so constructing my valve stem that it will be automatically cooled during its employment, thus greatly reducing its degree of expansion, its construction also allowing of constant and automatic lubrication of the stem and sleeve under certain conditions of use.

As a further insurance against the introduction of carbon, I prefer to employ a valve head which will deflect the gases from between the sleeve and the moving valve stem.

The above-mentioned, and other, new and valuable features of my device will be evident upon a consideration of my specification and its accompanying drawings.

In the accompanying drawings illustrating modified forms of my device, similar parts are designated by similar numerals.

Figure 1 is a side view of one form of the device of my invention, partly in section, adapted as a valve for exhaust gases in an internal combustion engine.

Figure 2 is a side view of the valve and the valve stem of Figure 1.

Figure 3 is a section through the line 3—3 of Figure 1.

Figure 4 is a side view of a modified form of my valve and valve stem.

Figure 5 is a side view, partly in section, of a modified form of my valve sleeve.

Figure 6 is a section through the line 6—6 of Figure 5.

The particular form of the device of my invention illustrated in Figures 1, 2 and 3 of the accompanying drawings is shown in connection with the exhaust pipe of an internal explosion engine having a piston 10 and the exhaust conduit 11.

My valve and valve stem shown in these drawings comprises a valve head 12 having an outwardly flared underface 13 fixedly attached to the valve stem 14.

A portion of the stem 14 is cut away leaving the opposed angular members 15, 15 and the centrally positioned quadrangular supporting member 16, the side edges of supporting member 16 being within the face of the stem 14.

Two passages 17, 17 are thus formed through the stem 14, and a connecting conduit 18 upon each side of the supporting member 16 connects the two passages 17, 17.

An annular recess 19 is formed within the stem 14 forming the shoulders 20 and 21.

A valve sleeve 22, has the extended annular flange 23 and three passages, or parts 24, 24, 24 positioned equidistant from each other.

In assembling the device the valve stem 14 is inserted downwardly, and the sleeve 22 is passed upwardly over the stem 14 until the upper face of its flange 23 abuts upon the shoulder 25 of the engine frame. A spiral spring 26 is then positioned as shown and the annular flanged member 27 is passed over the stem 14 and moved upwardly beyond the recess 19 of the stem 14. The two parts 28, 28 of the annular stop are then placed within the recess 19 of the stem 14 and the member 27 allowed to seat itself downwardly over the stop 28, 28. Further downward movement of the member 27 is thus prevented and the spring 26 is maintained under tension between the flange 23 of the sleeve 22 and the member 27.

The intermittent reciprocal movement of the rod 29, due to the engine operation, will, therefore, move the valve stem 14 upwardly raising the valve head 12 from the seat 30, the spring 26 closing the valve head 12 upon the seat 30 when the rod 29 is moved downwardly.

The operation of my device is as follows:—

When the device is in the position shown in Figure 1, both passages 17, 17, which are now in effect chambers because of the valve sleeve 22, are filled with air and as the valve stem 14 moves upwardly a portion of the contained air, and especially that within the lower passage 17, is forced outwardly through the ports 24, 24, 24 and as the stem 14 moves downwardly a new supply of air is introduced into the chambers 17, 17.

It is evident, therefore, that the valve stem 14 is automatically cooled by the passage of air therethrough.

It will be further noted that should any carbon enter between the stem and the sleeve it will gradually find its way into the stem opening and be ejected through the sleeve openings.

In the application of my device to an automobile engine in which the lower portion of the stem 14 is within the valve chamber containing oil, the passage of the contained air through my device carries an amount of oil, or oil vapor, therethrough thus lubricating the stem as well as cooling it.

I prefer to have my valve head with the deflecting flange 13, as the spent gases passing beneath the valve head 12, when it is open, will be deflected from the top of the valve stem, thus preventing carbon from entering between the stem 14 and the sleeve 22.

The modification of my device shown in Figure 4 is similar to that previously described, except that it does not have the bridge support 16, there thus being a single passage 31 through the stem 14.

The modification shown in Figures 5 and 6 refers to the valve sleeve which instead of being in one piece as in the previously described devices consists of two similar members 32, 32, each having a flange 33, the two parts 32, 32, when assembled having the three passages, or parts 34, 34, 34.

It will thus be seen that my device presents a valve stem which is automatically cooled and lubricated during its operation, and which will automatically eject any carbon which may be deposited therein.

I do not limit myself to the particular size, shape, number, arrangement or material of parts as illustrated and described, as these are given simply as a means for clearly describing my invention.

What I claim is:—

1. In a valve, in combination, a valve stem having a transverse opening therethrough, a valve head carried by said stem and a valve sleeve for said stem having plurality of openings therethrough, said stem and said sleeve being so positioned with respect to each other that the movement of said stem within said sleeve will force air through said openings in said stem and sleeve.

2. In a valve, in combination, a valve stem having a transverse opening therethrough, a bridge extending across said opening a valve head carried by said stem and a valve sleeve for said stem having a plurality of openings therethrough, said stem and said sleeve being so positioned with respect to each other that the movement of said stem within said sleeve will force air through said openings in said stem and sleeve.

3. In a valve, in combination, a valve stem having a transverse opening therethrough, a valve head carried by said stem, and a valve sleeve for said stem having a plurality of openings communicating with said stem opening.

4. In a valve, in combination, a valve stem having a transverse opening therethrough, a bridge extending across said opening, a valve head carried by said stem, and a valve sleeve for said stem having a plurality of openings communicating with said stem opening.

5. In a valve, in combination, a valve sleeve having a plurality of openings therethrough, a valve stem having a transverse opening therethrough and slidably movable within said sleeve, said sleeve openings communicating with said stem opening during said movement and means for sliding said stem within said sleeve.

6. In a valve, in combination, a valve stem having a transverse opening therethrough, a valve head carried by said valve stem, a valve sleeve for said stem having a plurality of openings therethrough, and means admitting air to said stem opening below said sleeve openings.

7. In a valve, in combination, a valve sleeve having a plurality of openings therethrough, a valve stem having a transverse opening therethrough and slidably movable within said sleeve, said sleeve openings communicating with said stem opening during said movement, means for sliding said stem within said sleeve and means admitting air to said stem opening other than through said sleeve openings.

Signed at New York city, in the county of New York and State of New York this 15th day of June, 1928.

WILLIAM M. STIEH, Jr.